United States Patent
Pullen et al.

(10) Patent No.: US 7,957,392 B2
(45) Date of Patent: Jun. 7, 2011

(54) METHOD AND APPARATUS FOR HIGH-PERFORMANCE BONDING RESEQUENCING

(75) Inventors: David Pullen, Buford, GA (US); Niki Pantelias, Duluth, GA (US); Dannie Gay, Lawrenceville, GA (US)

(73) Assignee: Broadcom Corporation, Irvine, CA (US)

( * ) Notice: Subject to any disclaimer, the term of this patent is extended or adjusted under 35 U.S.C. 154(b) by 0 days.

(21) Appl. No.: 12/829,545

(22) Filed: Jul. 2, 2010

(65) Prior Publication Data

US 2010/0265954 A1    Oct. 21, 2010

Related U.S. Application Data

(63) Continuation of application No. 11/902,603, filed on Sep. 24, 2007, now Pat. No. 7,751,404.

(60) Provisional application No. 60/849,836, filed on Oct. 6, 2006.

(51) Int. Cl.
     *H04L 12/28* (2006.01)
(52) U.S. Cl. .......................... 370/394; 370/412
(58) Field of Classification Search .................. 370/392, 370/394, 412, 420
     See application file for complete search history.

(56) References Cited

U.S. PATENT DOCUMENTS

| | | | |
|---|---|---|---|
| 6,047,364 A | | 4/2000 | Kolagotla et al. |
| 6,934,760 B1 * | | 8/2005 | Westbrook et al. ........... 709/231 |
| 7,489,641 B2 * | | 2/2009 | Miller et al. ............... 370/241.1 |
| 2003/0214949 A1 * | | 11/2003 | Shaikli ........................... 370/394 |
| 2004/0143593 A1 * | | 7/2004 | Le Maut et al. ............... 707/102 |
| 2007/0097907 A1 * | | 5/2007 | Cummings .................... 370/329 |
| 2007/0206600 A1 * | | 9/2007 | Klimker et al. ............... 370/394 |
| 2008/0130649 A1 * | | 6/2008 | Pullen ........................... 370/394 |

FOREIGN PATENT DOCUMENTS

| WO | WO 00/60813 A1 | 10/2000 |
|---|---|---|
| WO | WO 2006/020559 A2 | 2/2006 |

OTHER PUBLICATIONS

Search Report and Written Opinion for International Application No. PCT/US2007/021395 mailed Apr. 9, 2008, 10 pgs.
Notification Concerning Transmittal of International Preliminary Report on Patentability, International Application No. PCT/US2007/021395, International Filing Date: Oct. 5, 2007.

* cited by examiner

*Primary Examiner* — Hong Cho
(74) *Attorney, Agent, or Firm* — Sterne, Kessler, Goldstein & Fox P.L.L.C.

(57) ABSTRACT

A method, system, and computer program product for receiving and resequencing a plurality of data segments received on a plurality of channels of a bonding channel set, comprising deter mining if a sequence number of a received segment matches an expected sequence number. If so, the process includes forwarding the segment for further processing, incrementing the expected sequence number; and forwarding any queued packets corresponding to the expected sequence number and immediately succeeding sequence numbers less than a sequence number of annexed missing segment. If the sequence number of the received segment does not match the expected sequence number, the received segment is queued at a memory location. The address of this location is converted to a segment index. The segment index is stored in a sparse array.

20 Claims, 10 Drawing Sheets

```
              Next PSN
                 /
     8     9    10    11    12    13    14    15    16    17
   +----+----+----+----+----+----+----+----+----+----+
...|ffff|ffff| T40| T40| T40| 75 |ffff|ffff|ffff|ffff|...
   +----+----+----+----+----+----+----+----+----+----+
```

FIG. 7

```
                    Next PSN
                   /
      8      9    10    11    12    13    14    15    16    17
   +----+----+----+----+----+----+----+----+----+----+
...|ffff|ffff| T40|  9 | T40| 75 |ffff|ffff|ffff|ffff|...
   +----+----+----+----+----+----+----+----+----+----+
```

FIG. 8

```
                                        Next PSN
                                       /
      8    9   10   11   12   13   14   15   16   17
    +----+----+----+----+----+----+----+----+----+----+
...|ffff|ffff|ffff|ffff|ffff|ffff|ffff|ffff|ffff|ffff|...
    +----+----+----+----+----+----+----+----+----+----+
```

FIG. 9

METHOD AND APPARATUS FOR HIGH-PERFORMANCE BONDING RESEQUENCING

This application is a continuation of U.S. application Ser. No. 11/902,603, filed Sep. 24, 2007, now U.S. Pat. No. 7,751,404, which claims the benefit of U.S. Provisional Application No. 60/849,836, filed on Oct. 6, 2006, all of which are incorporated herein by reference in its entirety.

BACKGROUND OF THE INVENTION

1. Field of the Invention

The invention described herein relates to communications systems, and more particularly relates to transmission and processing of segmented or packetized data.

2. Related Art

Channel bonding is the process of taking multiple independent communications channels between two points and treating them as though they were a single "virtual" channel with more total bandwidth than would otherwise be possible. In addition to greater capacity, this arrangement has additional benefits such as increased overall reliability of a virtual channel. Given that a virtual channel is made of multiple physical channels, there is inherent redundancy that allows for continued operation if one or more physical channels fail.

The concept of channel bonding is illustrated generally in the cable communications system of FIG. 1. In this example, a cable modem termination system (CMTS) 110 is shown in communication with a cable modem (CM) 130. Data passes from CMTS 110, via channels 120a through 120i, to CM 130. During a given session, some or all of channels 120a though 120i can be bonded together, so that segmented data for the session (e.g., packets) can be sent through these channels. A given segment or packet will be sent over one of the channels; the next segment or packet may be sent over the same channel, or over a different channel in this bonding channel set (BCS). The CM 130 must then reassemble the segments or packets in order before delivery to an end user.

One approach for sending data on the bonded channels is for the sending end to transmit entire packets, spreading them out among the channels based on load balancing, rate limiting, or other means for selecting channels. Another approach is to concatenate a series of packets into a byte stream, subdividing the stream into segments for transmission on various channels. In either case, the packets/segments are tagged with a sequence number by the transmitting entity (e.g., the CMTS) so that the receiving entity (e.g., the CM) can reproduce the data stream in the proper packet/segment order. This is known as resequencing, and ensures that data is not delivered out of order to the end user.

Resequencing across multiple bonded channels, however, can be a time-intensive process and may consume considerable memory. Segments or packets may be received out of order. At the receiving end, gaps may appear, where a segment or packet goes missing while one or more later numbered segments are received on any of the several bonded channels. Such later numbered segments must be saved in memory until the missing segment is received. At this point the missing segment can be delivered to the end user, along with any saved segments that sequentially follow the missing segment. Such saved segments must be read from memory and delivered to the user in numerical order.

A high-performance, low-cost device like a cable modem can benefit from an efficient method for queuing packets for resequencing. Ideally, an implementation in a CM or CMTS would be fast and not require large amounts of memory/register resources. What is needed, therefore, is a system and method for efficiently resequencing packets or other data segments at a receiving node, wherein the resequencing process requires minimal memory and operates relatively rapidly.

BRIEF DESCRIPTION OF THE FIGURES

FIGS. 6-9 illustrate the structure and content of an exemplary sparse array at various stages of processing, according to an embodiment of the invention.

DETAILED DESCRIPTION OF THE INVENTION

Figure 1:
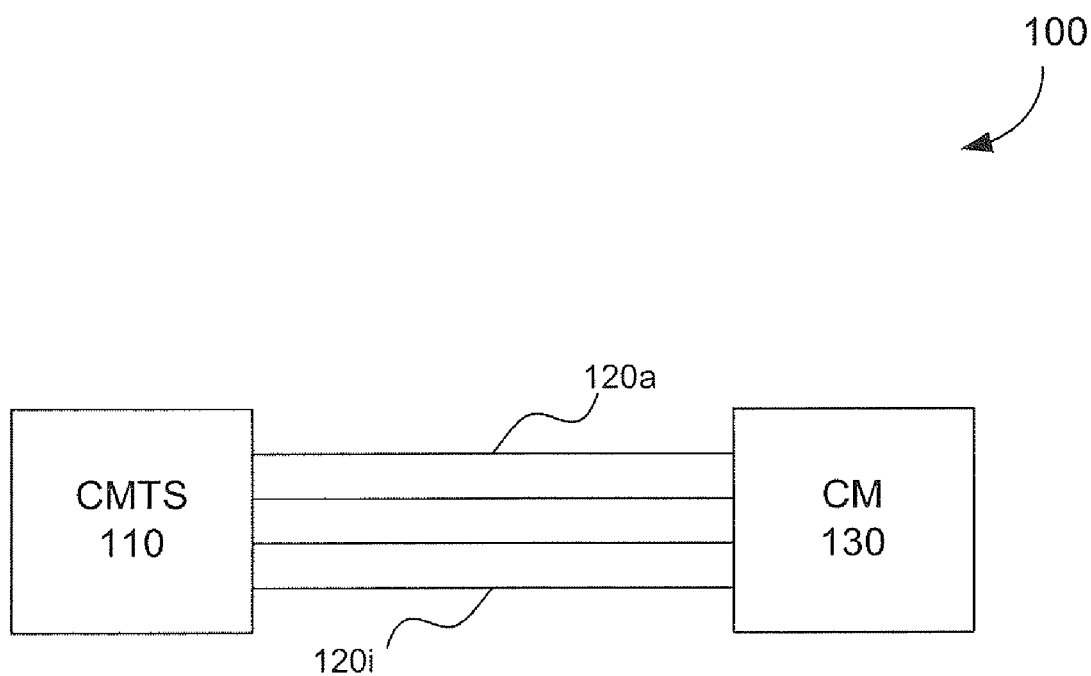
FIG. 1 is a block diagram illustrating a set of bonded channels in a communications system.

A preferred embodiment of the present invention is now described with reference to the figures, where like reference numbers indicate identical or functionally similar elements. Also in the figures, the leftmost digit of each reference number corresponds to the figure in which the reference number is first used. While specific configurations and arrangements are discussed, it should be understood that this is done for illustrative purposes only. A person skilled in the relevant art will recognize that other configurations and arrangements can be used without departing from the spirit and scope of the invention. It will be apparent to a person skilled in the relevant art that this invention can also be employed in a variety of other systems and applications.

I. Introduction

The invention described herein represents a method and system for resequencing packets or segmented data that is received through a BCS. Given that the segments may be received out of order, the invention resequences the segments at the receive end for delivery to an end user. Some segments may be lost and never received. The invention allows the receive end to determine whether a missing segment should be considered lost, and to continue processing segments. The invention may be embodied in software or hardware, or a combination of both.

The system can be applied to communications conforming to a version of the Data Over Cable System Interface Specification (DOCSIS) standard, or a similar standard. For example, the invention may be implemented in a cable modem or other end user device that receives downstream data segments or packets from a cable modem termination system over a set of bonded channels. The following discussion is therefore presented in terms of downstream communications from a CMTS to a CM. Note however that the invention may also be applied with respect to bonded channel upstream communications, from a CM to a CMTS. Moreover, the invention may also be applied to DOCSIS based systems that use a medium other than cable, including but not limited to fiber and wireless media. The invention may also be applied in communications systems that do not conform to any version of a DOCSIS standard.

II. Terminology

The following terms are used to describe bonding operations. Some of the terms are also defined by the DOCSIS 3.0 specification:

RCS: Receive channel set. This is the set of communications channels on which the receiving entity is capable of receiving data.

BCS: Bonding channel set. This is a subset of the RCS and represents the channels that the transmitting and receiving entities have agreed to use for sending data associated with a bonding session.

Bonding session: The state information used by the transmitting and receiving entities for performing bonding. There can be multiple bonding sessions active at the same time.

DSID: Downstream service identifier. This is used to identify a particular downstream bonding session (upstream bonding uses a different mechanism to identify the session). Downstream segments or packets can be tagged with the DSID so that the CM knows to which session the packet or segment belongs.

PSN: Packet sequence number. This is a number indicating the order of a segment or packet in a bonding session relative to other segments or packets in the bonding session. Packets or segments are tagged with the PSN so that the receiving entity knows how to resequence them. Note that DOCSIS 3.0 requires packets to be sent in increasing PSN order on a channel (e.g., the transmitting entity can send PSN 3 then PSN 5 on channel 0, but it cannot send PSN 5 followed by PSN 3).

Channel ID: A number representing the channel on which a segment or packet was received. Packets or segments are not tagged with the channel ID, since the receiving channel is necessarily known by the receiving entity.

This invention is applicable to any bonded channel communications system that transmits and processes individual blocks of data that result from the segmentation of a larger data stream. Such segments may or may not be packets, as this term is conventionally understood by a person of ordinary skill in the art. The term "segment" will therefore be used throughout the remainder of this discussion.

III. Resequencing

The receiving entity, e.g., a CM, maintains a counter or variable representing the
PSN of the next expected segment in any given bonding session. A received segment will be tagged with a PSN and a DSID identifying the bonding session. When the CM receives a segment, the CM looks up the bonding session associated with the DSID of the segment. If the PSN of the segment matches the PSN that is expected next for the session, the segment is forwarded and the session's state is updated by incrementing the next expected PSN. If the PSN does not match the next expected PSN, the segment is queued for later processing, based on the assumption that the segment having the next expected PSN should arrive on one of the BCS channels at some point in the future. In this case the next expected PSN is not incremented.

Segments with higher PSNs may arrive before segments with lower PSNs for a number of reasons. Some examples include:

Channel congestion—The CMTS queues a segment identified by PSN 1 to be sent on channel 0, and queues a segment identified by PSN 2 on channel 1. However, if some other segment was previously queued to be sent on channel 0, then the segment identified by PSN 1 must wait and may be sent later than the segment identified by PSN 2. The segment of PSN 2 may therefore arrive before the segment of PSN 1.

Latency/speed—If the channels in the BCS have different characteristics (interleaver depth, modulation rate, etc.), then segments queued to be sent at the same time will arrive at different times simply because it takes longer for the bits to traverse a "slower" channel.

Segment size—A segment can only be processed by the CM when all of the bits have arrived. All other things being equal, a smaller segment may therefore be treated as having arrived sooner than a larger segment.

Channel service ordering—The CM can receive segments simultaneously on multiple channels, but may service the channels in an order that causes segments to be processed in non-PSN order.

Segment loss—A segment with a lower PSN might be lost (due to error, overflow, etc), causing segments with higher PSNs to be queued until a timeout expires or some other event takes place that forces the CM to treat the missing segment(s) as unrecoverable. This is discussed in greater detail below.

More than one of these situations may be present at the same time.

The CM must buffer segments with higher PSNs until the missing segments arrive. If the missing segments are lost, either a timeout or rapid loss detection will cause the missing segments to be skipped and treated as unrecoverable.

Figure 2:
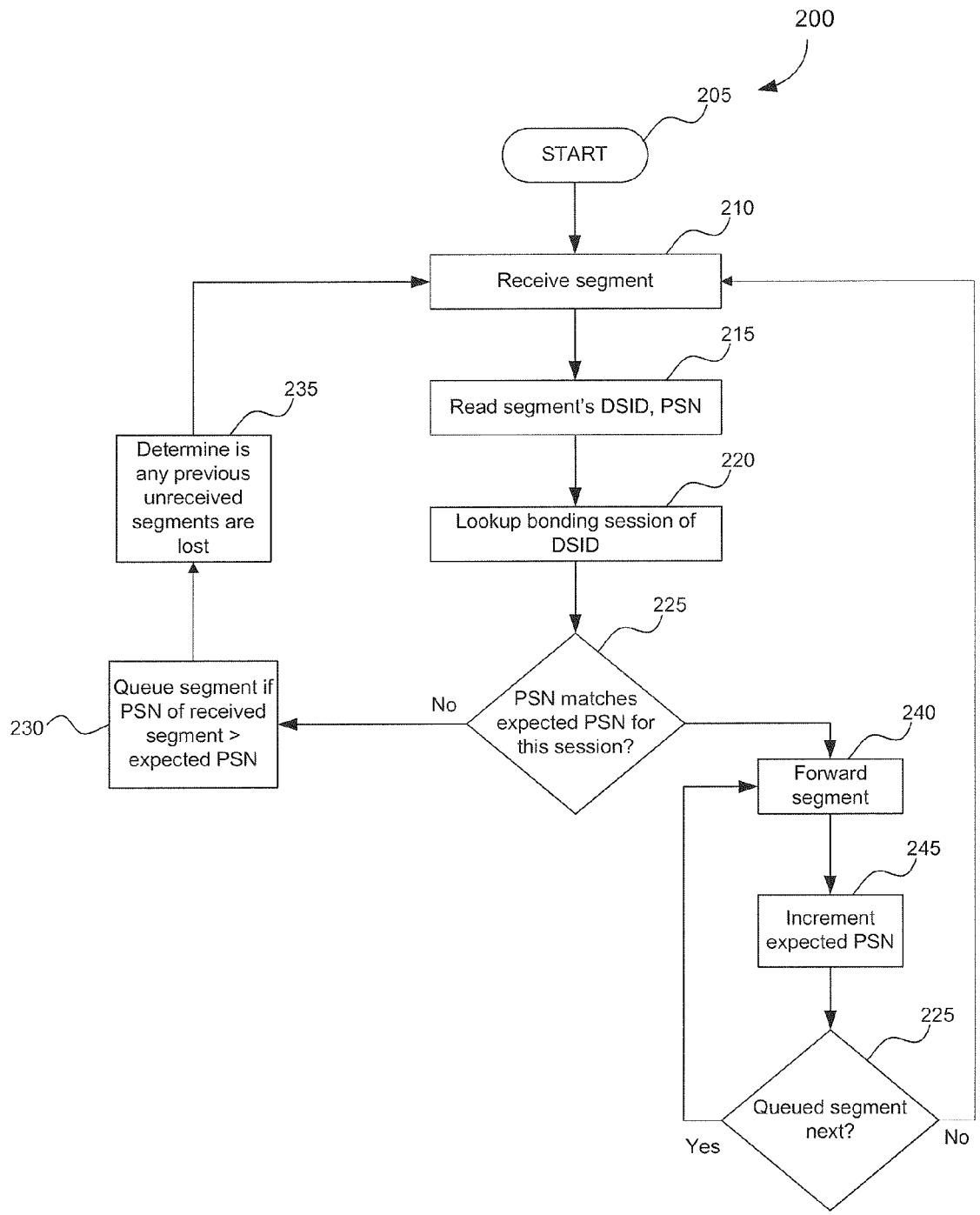
FIG. 2 is a flowchart illustrating the processing of an embodiment of the invention.

An embodiment of the resequencing process is illustrated in FIG. 2. FIG. 2 illustrates a process for receiving of a segment and either saving the segment or forwarding the segment, as necessary. The process starts at step 205. In step 210, the segment is received by a receiving entity, such as a CM. In step 215, the DSID and the PSN of the segment are read. In step 220, the receiving entity looks up the bonding session of the segment, as indicated by the DSID. In step 225, a determination is made as to whether the received PSN matches the value representing the next expected PSN for this session.

If so, then in step 240, the received segment is forwarded on to the end user. The segment may alternatively be forwarded for additional processing. In step 245, the value indicating the next expected PSN is incremented. In step 250, a determination is made as to whether there is a queued segment corresponding to the incremented expected PSN. If not, the process returns to step 210, where the next segment is received. If it is determined in step 250 that there is a queued segment corresponding to the expected PSN, then the process continues at step 240, where the queued segment is forwarded.

If, in step 225, the PSN of the received segment is greater than the expected PSN for the session, then in step 230 the segment is queued. Step 230 will be discussed in greater detail below with respect to FIG. 3.

In step 235, a determination is made as to whether there are any unreceived segments that should be treated as lost. This step will be discussed in greater detail below with respect to FIG. 4. The process then returns to step 210.

Figure 3:
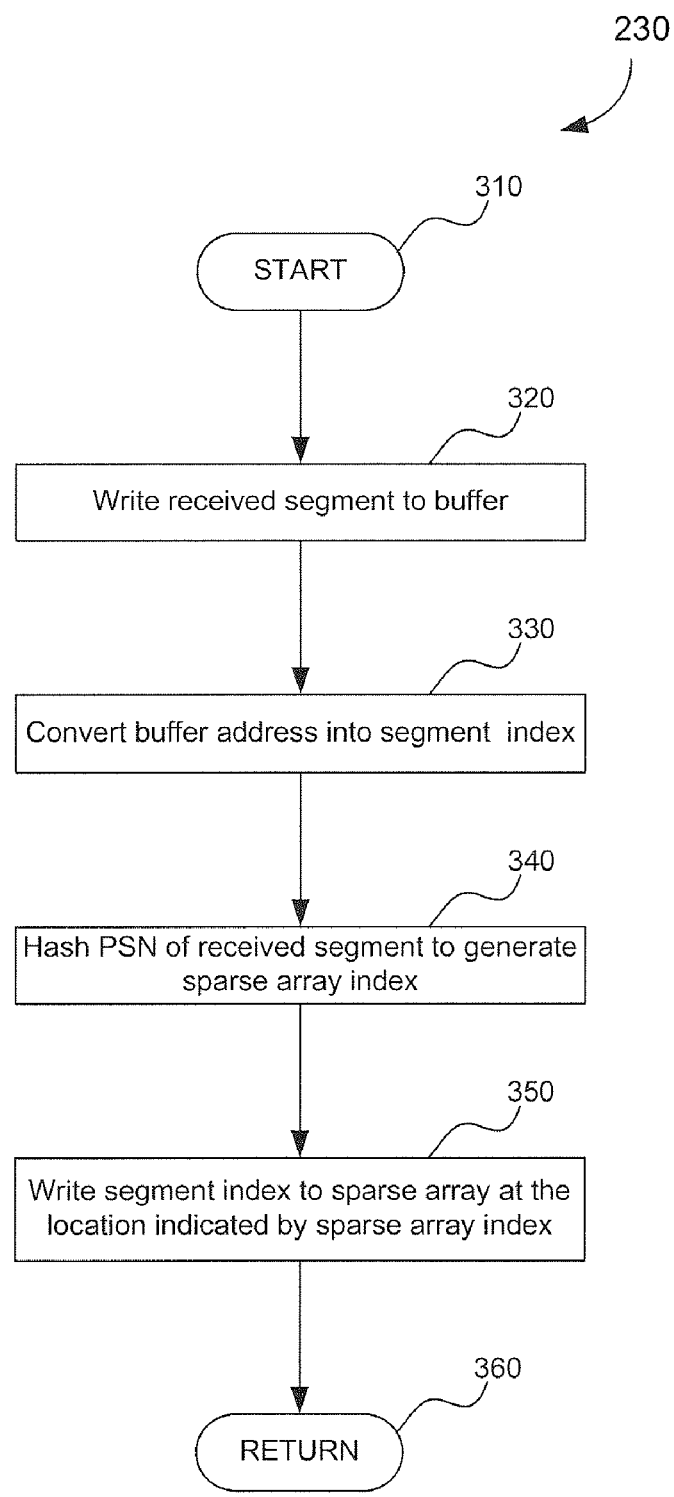
FIG. 3 is a flowchart illustrating the process of queuing a segment, according to an embodiment of the invention.

FIG. 3 illustrates in greater detail step 230, the queuing of a received segment. The process begins at step 310. In step 320, the received segment is written to a buffer. In step 330, the buffer address is converted into a segment index. In step 340, the PSN of the received segment is hashed to generate a sparse array index. In step 350, the segment index is written to the sparse array at the location indicated by the sparse array index derived above in step 340. In step 360, the process concludes.

Figure 4:
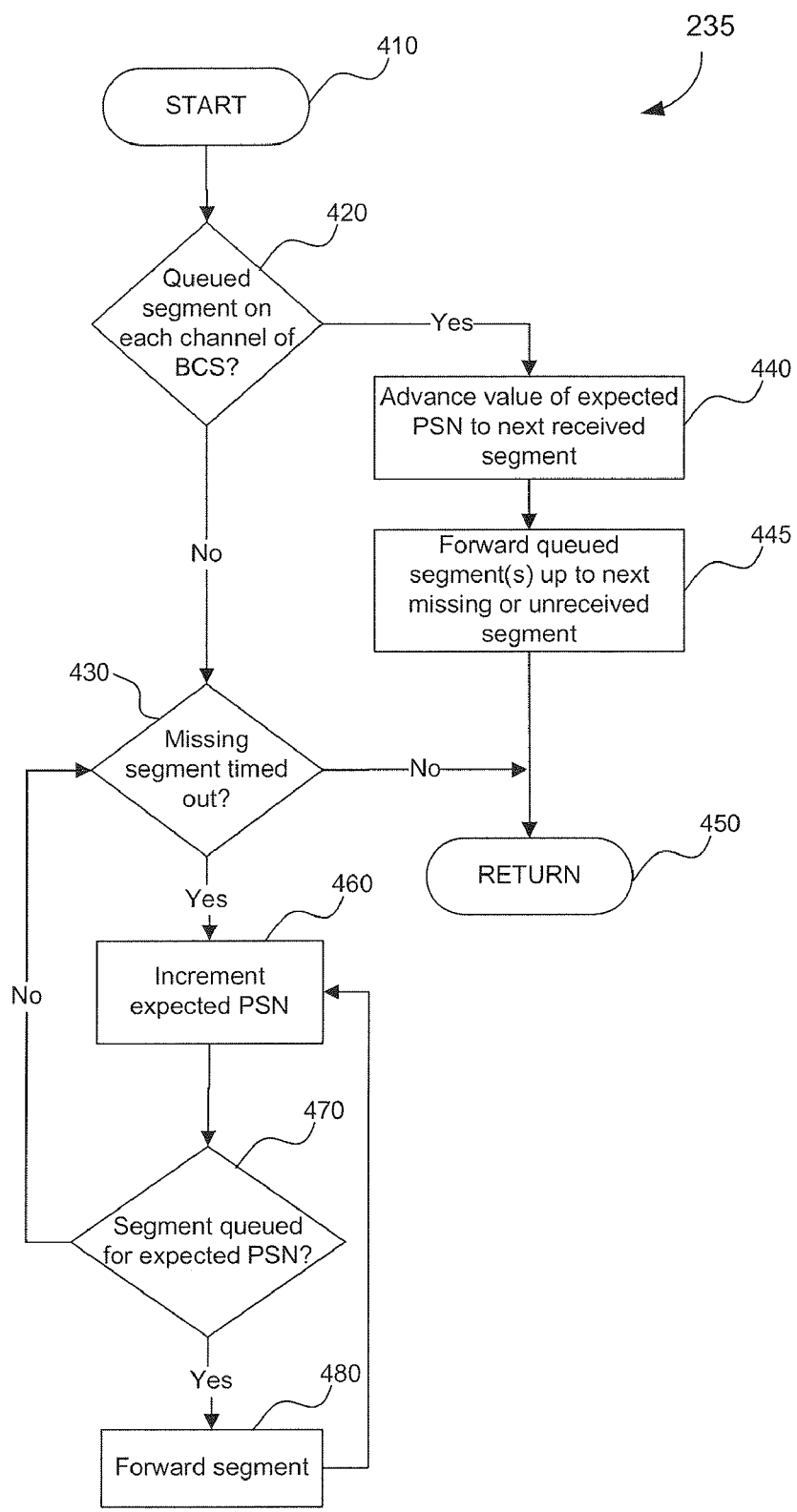
FIG. 4 is a flowchart illustrating the process of determining whether a segment is lost, according to an embodiment of the invention.

Step 235, the determination of whether any previous unreceived segments have been lost, is illustrated in greater detail in FIG. 4 according to an embodiment of the invention. The process as illustrated begins at step 410, then applies two tests to determine if a segment should be treated as lost. In step 420, the first test is applied: a determination is made as to whether a queued segment is present on each channel of the BCS. If so, the process continues at step 440. Here, the value of the expected PSN is advanced to the PSN corresponding to the next segment that has been received. Therefore, when enough segments have been queued (as determined by the presence of one or more queued segments on each channel), it is determined that the volume of waiting (i.e., queued) data is sufficient to merit the designation of any unreceived packet(s) as lost. This allows the expected PSN to be incremented to the PSN of the next received segment (step 440). This queued segment is then forwarded (step 445). Step 445 includes the removal of such segments from a queue; this operation is discussed in greater detail below with respect to FIG. 5.

If, in step 420, the determination is made that not every channel of the BCS has a queued segment, then the process continues at step 430. Here, the second test is applied: a determination is made as to whether a given unreceived segment has been missing for longer than a predetermined period. If not, the process concludes at step 450. But if a missing segment has been missing for longer than the predetermined period, then the missing segment is said to have timed out. The process has waited long enough, as defined by the predetermined period, to merit treating the unreceived segment as lost. The expected PSN is then incremented in step 460, skipping over the missing segment.

If it is determined in step 470 that the expected PSN now indicates a segment that is currently queued, then the queued segment is forwarded in step 480. The process then continues at step 460, where the expected PSN is incremented again. The cycle of incrementing the expected PSN (step 460) and forwarding the indicated segment (step 480) continues as long as a queued segment corresponding to the expected PSN remains, as determined in step 470.

If, in step 470, it is determined that there is no queued segment corresponding to the expected PSN, then the process returns to step 430, where it is determined if any additional missing segment has timed out.

Note that steps 420 and 430 represent two conditions, either of which signify that one or more missing segments are to be treated as lost. In alternative embodiments of the invention, other tests may be used in lieu of, or in addition to, these tests.

Figure 5:
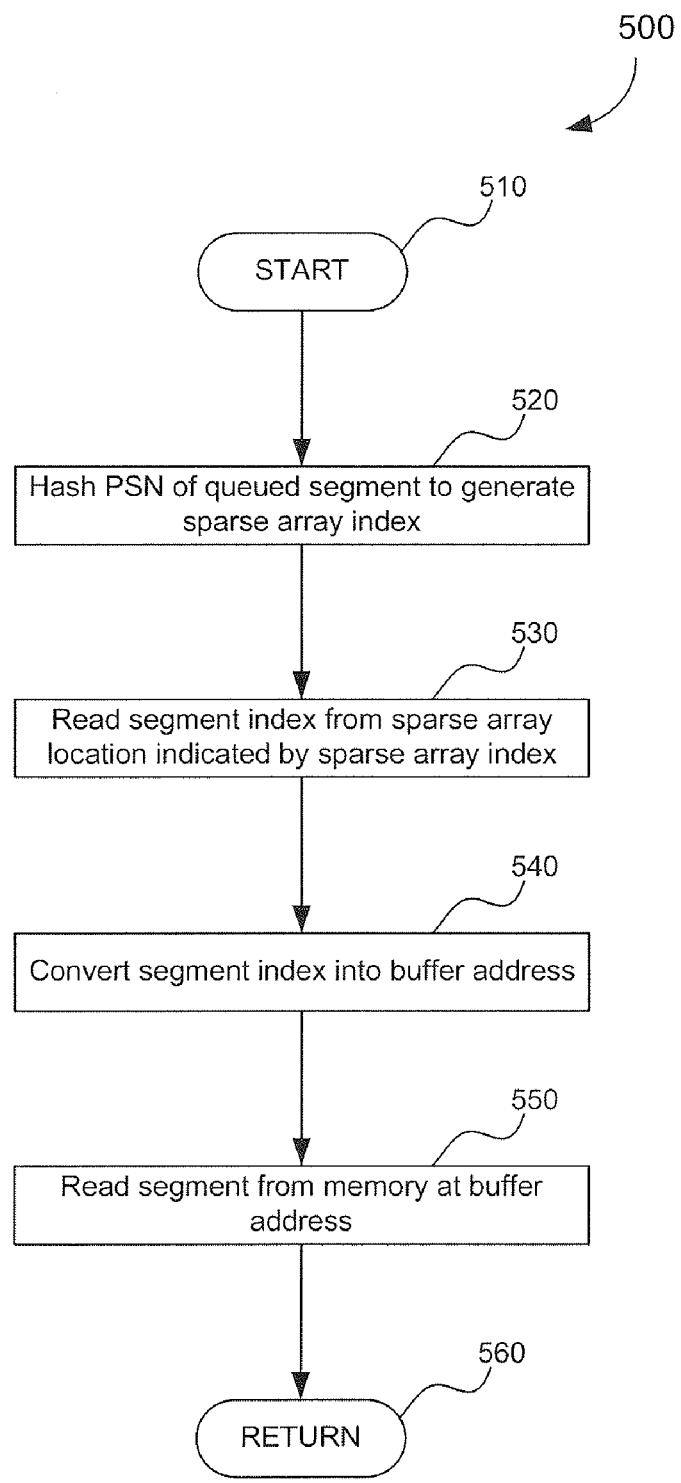
FIG. 5 is a flowchart illustrating the process of removing a segment from a queue, according to an embodiment of the invention.

FIG. 5 illustrates a process for removing a segment from a queue, according to an embodiment of the invention. The process begins at step 510. In step 520, the PSN of the queued segment is hashed to generate an index to a sparse array. In step 530, a segment index is read from the sparse array. In particular, the segment index is read from the location in the sparse array indicated by the sparse array index generated above. In step 540, the segment index is converted into a buffer address. In step 550, the segment is read from memory at the buffer address. The process concludes at step 560.

The steps in the process discussed above are illustrated further with the following example. Note that while the following discussion describes the processing of the invention in terms of downstream communications over a bonded channel set from a CMTS to a CM, the process can be applied in an upstream direction as well. Moreover, the invention is not limited to cable media or to DOCSIS-related communications.

IV. Example

The following illustrates the operation of an embodiment of the invention. This example is presented for purposes of showing how the invention functions in the context of a hypothetical BCS that is used to transmit a set of data segments. This is an example only, and is not intended to limit the scope of the invention.

Assume that a CM has an RCS of four channels (channels 0-3). Assume further that there is a single bonding session with DSID 1, and that the BCS of the session consists of three channels (0-2). The CM is waiting for the next segment, with the expected PSN having a value of 10 on DSID 1. The table below shows the PSNs of segments that were sent by the CMTS. The table also shows when the segments were sent and the channels on which they were sent. Blank entries indicate that no segments were sent at a particular time and channel. In this example, segments with PSN 10, 15, 17, and 19 are missing, perhaps due to errors on the channel.

|      | Channel |    |    |    |
|------|---------|----|----|----|
| Time | 0       | 1  | 2  | 3  |
| 7    |         |    |    |    |
| 6    |         |    |    |    |
| 5    | ~~19~~  |    |    |    |
| 4    |         | 20 | 18 |    |
| 3    |         | 16 | ~~17~~ |    |
| 2    | 14      | ~~15~~ | 12 |    |
| 1    | 13      | 11 |    |    |
| 0    | ~~10~~  |    |    |    |

The following events take place:

At time 0: The segment having PSN 10 is sent by the CMTS but nothing is received at the CM.

At time 1:

The segment having PSN 13 arrives on channel 0. This does not match the expected next PSN of 10, so this received segment is queued for later processing.

The segment having PSN 11 arrives on channel 1. This does not match the expected next PSN of 10 and is queued.

At time 2:

The segment having PSN 14 arrives on channel 0. This does not match the expected next PSN of 10 and is queued.

The segment having PSN 15 is sent by the CMTS but not received at the CM.

The segment having PSN 12 arrives on channel 2. This does not match the expected next PSN of 10 and is queued.

The CM now has a segment queued on each channel of the BCS, so it can assume that PSN 10 was lost. Segments with PSN 11, 12, 13, and 14 can be forwarded immediately.

The next expected PSN is set to 15, and the CM has no segments queued on any channel.

At time 3:

The segment having PSN 16 arrives on channel 1. This does not match the expected next PSN of 15 and is queued.

The segment having PSN 17 is sent by the CMTS but not received at the CM.

At time 4:

The segment having PSN 20 wives on channel 1. This does not match the expected next PSN of 15 and is queued.

The segment having PSN 18 arrives on channel 2. This does not match the expected next PSN of 15 and is queued.

At time 5:

The segment having PSN 19 is sent by the CMTS but not received at the CM.

At future time N (where N represents the end of the timeout period):

The CM times out waiting for the segment having PSN 15, and assumes that this segment was lost.

The segment with PSN 16 can be forwarded immediately.

The next expected PSN is set to 17.

At future time N+1:

The CM times out waiting for the segment having PSN 17, and assumes that this segment was lost.

The segment with PSN 18 is forwarded immediately.

The next expected PSN is set to 19.

At future time N+3:

The CM times out waiting for the segment having PSN 19, and assumes that this segment was lost.

The segment with PSN 20 can be forwarded immediately.

The next expected PSN is set to 21.

V. Implementation of an Embodiment of the Invention

As discussed above, a CM is required to keep track of the per-bonding session state, particularly the next expected PSN, and provide storage for queuing segments that have a PSN not matching the next expected PSN. It must also keep track of timers and/or timestamps associated with segments that are missing. This can be used in timeout processing, described below, when determining whether missing segments are unrecoverable.

The segment queues and timers/timestamps can consume a substantial amount of memory depending on what mechanism is used to represent them. This increases system cost (requiring larger memories to track the state), and decreases system efficiency since the large amount of data must be accessed frequently (causing lots of bus/RAM accesses and thrashing the cache).

The number of segments and timers/timestamps needed to avoid segment loss due to local system resources can be calculated based on the bonding channel characteristics. The maximum number of segments that may have to be queued, NumEntries, can be estimated as follows:

$$NumEntries = PacketRate * (MaxDelayMs/1000) * NumChannels$$

where

PacketRate is the number of segments received per second per channel,

MaxDelayMs is the maximum delay for any segment, measured in milliseconds, and

NumChannels is the number of channels in the BCS.

Note that in the case where the channels are not loaded symmetrically, the equation becomes:

$$NumEntries = AggregatePacketRate * (MaxDelayMs/1000)$$

where AggregatePacketRate is the rate at which segments are received across all channels of the BCS, as measured in segments per second. Thus, if the expected packet rate is 88 k segments per second per channel, the maximum channel delay is 23 ms, and there are 4 channels:

$$NumEntries = 88,000 * (23/1000) * 4 = 8096 \text{ entries per bonding session.}$$

If a standard doubly linked list is used (assuming 12 bytes per entry), this consumes almost 95 k bytes of memory per bonding session. If a CM is required to support at least 16 sessions, this would consume approximately 1.5 MB of RAM.

Poor segment queue organization can lead to even worse CM forwarding performance, because segments must be forwarded in PSN order, but are frequently not received in PSN order. The CM needs to manage the queue frequently (add/remove/find segments and timers/timestamps), and the queue organization affects the number of operations performed.

A method for storing segments and timestamps for resequencing is to use a sparse array (also known as a vector). For a given segment, the array is accessed by using a hash of the PSN of the segment. In an embodiment of the invention, the sparse array is an array of 16-bit values. This may be chosen because it can be a natural size for a CPU, and it allows the CM to keep track of a large number of outstanding segments for resequencing while limiting the amount of memory that is used. Other embodiments can use values of 32 bits or more.

If the bonding channel characteristics (e.g., PacketRate, MaxDelayMs, and NumChannels) suggest that fewer entries are needed to store segments, then the array values could be of a different size (e.g. 8 bits). If there are more channels, then larger entries may be required (e.g. 32 bits). A hardware implementation could alternatively use an arbitrary bit size (e.g. 12 bits), tailored to match an alternative hardware environment.

If the PSN is a 16-bit value, this means that a direct-mapped sparse array would have 64 k entries; if an entry is 16 bits long, this will consume 128 k bytes. This can be inefficient, though, since only enough segments are needed to satisfy the MaxDelayMs value (almost 8 k entries in the previous example). As a result, the size of the sparse array may be smaller than 64 k entries.

Note that in a software implementation, it may be convenient to make the sparse array size a power of two. This is so that the sparse array index and the PSN wrap back to zero uniformly with each other, making tracking the current offset easier. A hardware implementation (or a more complex software implementation) could allow the sparse array size to be other than a power of two.

The NumEntries value calculated by the equation above can be rounded up or down as desired in order to make it a power of two (rounding down uses less memory but runs the risk of not being able to buffer enough segments; rounding up uses more memory, but guarantees that segments will not be discarded due to buffering constraints at high segment rates). High segment rates may be unlikely except in limited stress tests, in which case rounding down would be acceptable.

Figure 6:
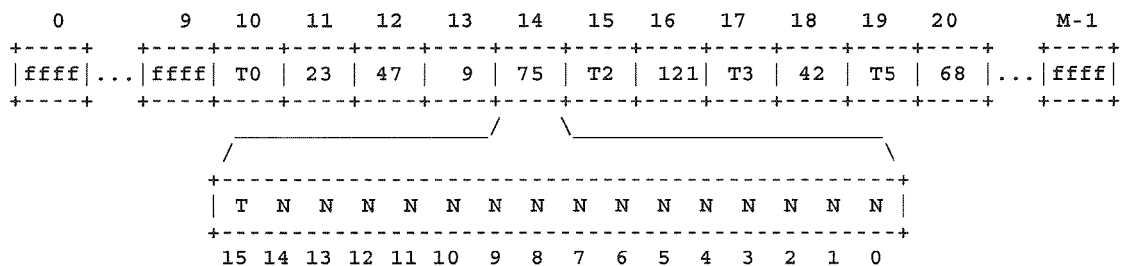

FIG. 6 following shows the state of a sparse array based on the previous resequencing example. The sparse array has M entries. Note that in the illustrated embodiment, 0xffff is a special value that indicates "slot empty"—a segment is not queued, and a timeout is not active. If the millisecond clock count is 0x7fff (which would cause 0xffff to be stored), then the clock count is incremented to 0x0000, and 0x8000 is stored. This will cause segments to be buffered 1 ms longer than the max timeout, but such a discrepancy is allowed by the DOCSIS specification.

The entries in the sparse array are indexed by the PSN associated with the segment. In an embodiment of the invention, the hash is simply the PSN reduced by a modulus equal to the array size:

SparseArrayIndex=PSN mod ArraySize

Thus, if the array size is 4096, then the array indices for PSNs 1, 4098, and 7121 are as follows:

SparseArrayIndex=1 mod 4096=1

SparseArrayIndex=4098 mod 4096=2

SparseArrayIndex=7121 mod 4096=3025

The segment index N is stored in a sparse array entry, and is calculated from the segment buffer address; when a segment is received on the downstream, it can be stored through direct memory access (DMA) into a buffer. The buffer is tracked via a 32-bit address in this example. This address is too large to store in the 15-bit field available in the sparse array entry. However, since the DMA buffers are contiguous in memory, and are of a uniform size, a segment index can be calculated from the buffer address at which the segment is stored:

SegmentIndex=(BufferAddress−BaseAddress)/BufferSize

For example, if the BaseAddress for the DMA buffers is 0x80201380, and each buffer is 2048 bytes, then the packet indices for buffers with addresses 0x80205b80 and 0x80226b80 are:

SegmentIndex=(0x80205b80−0x80201380)/2048=9

SegmentIndex=(0x80226b80−0x80201380)/2048=75

Likewise, a pointer can be calculated from its index:

BufferAddress=(SegmentIndex*BufferSize)+BaseAddress

Using the same buffers from the previous example:

BufferAddress=(9*2048)+0x80201380=0x80205b80

BufferAddress=(75*2048)+0x80201380=0x80226b80

As noted previously, when a segment arrives on the downstream, if the PSN does not match the next expected PSN for the bonding session, then the CM can buffer the segment and start a timeout timer for the missing segment(s).

The CM converts the address of the buffer into a segment index, and hashes the

PSN to find the entry in the sparse array to store the segment index. Then, for each entry from the next expected PSN to the PSN of the segment that was received, the CM calculates the current millisecond time (modulus 15 bits, with the MSB set to 1), and stores this clock count to indicate the time when the gap was formed. The clock count can be viewed as a timeout value.

For example, if the next expected PSN is 10, a segment with PSN 13 arrives at time 40, and is stored via DMA into the buffer with address 0x80226b80 (segment index 75), then the sparse array will be as shown in FIG. 7.

Later, if one of the missing segments arrives (which has a timeout value in the sparse array), the segment index overwrites the timeout value, effectively canceling the timeout for that entry. For example, if a segment with PSN 11 arrives at time 41 and is stored into the buffer with address 0x80205b80 (segment index 9), then the sparse array will be as shown in FIG. 8.

If segments with PSNs 10 and 12 never arrive (e.g., lost due to errors, etc.), then the queued segments will be released from the queue once the MaxDelayMs time has elapsed. Once a timeout expires or a segment is forwarded from the queue, the value for that entry is set to 0xffff to indicate that the slot is not being used. This is shown in FIG. 9.

Note that the mapping of timer values and segment indices to a 15-bit value (with another bit used to signify whether the other 15 bits represent a timer value or a segment index) is exemplary only. This particular arrangement is not meant to limit the scope of the invention. Alternative embodiments are also feasible, as would be known to a person of skill in the art.

VI. Computing Context

Figure 10:
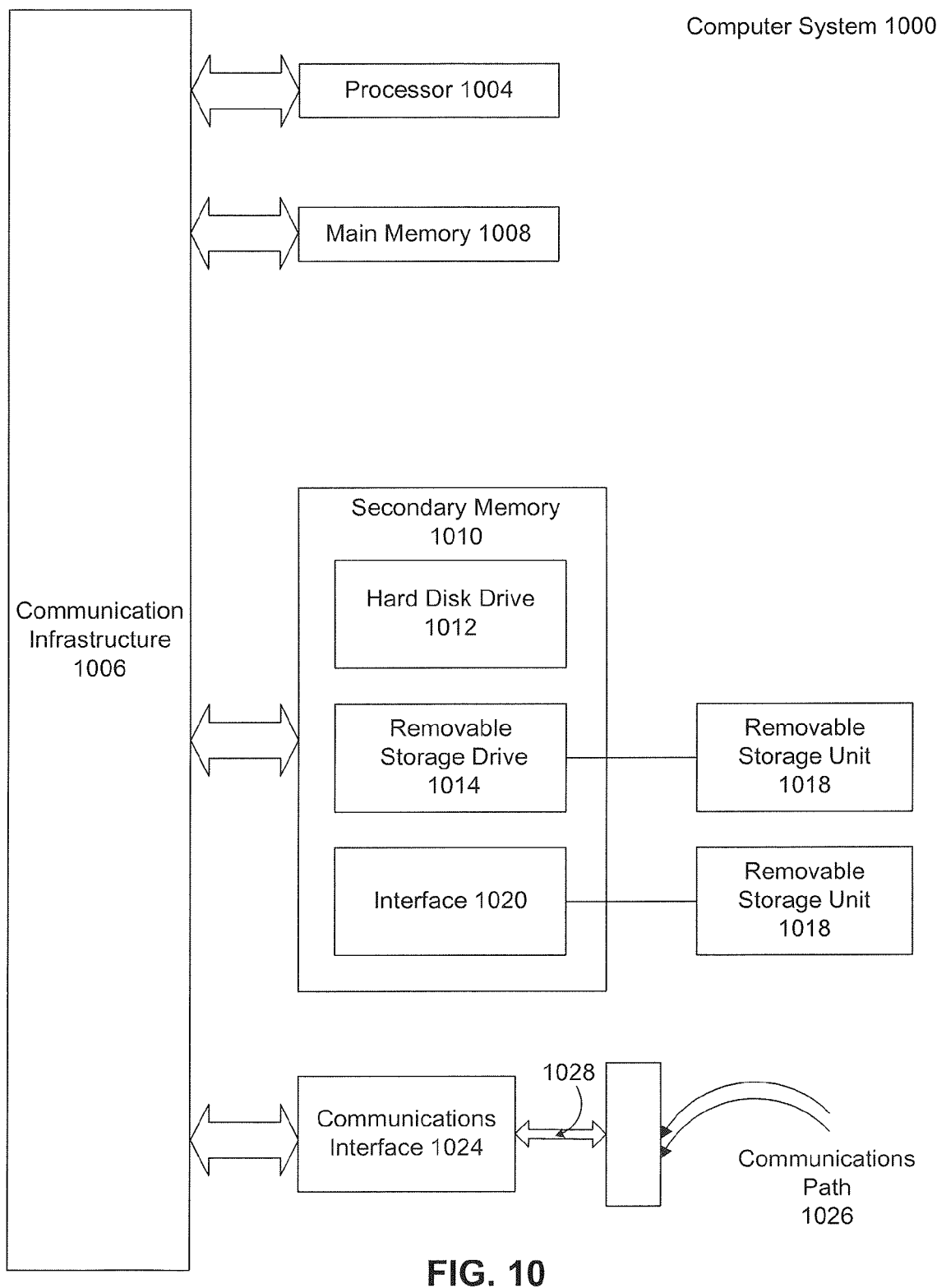
FIG. 10 is a block diagram illustrating the computing environment of the invention, according to an embodiment thereof Further embodiments, features, and advantages of the present invention, as well as the operation of the various embodiments of the present invention, are described below with reference to the accompanying drawings.

In an embodiment of the present invention, the processing of the invention described herein is implemented using control logic (software) that is executed in one or more computer systems, such as computer system 1000 shown in FIG. 10. The computer system 1000 can be any computer system capable of performing the functions described herein. In an embodiment of the invention, such a computer system is incorporated in a communications device, such as CM 130, or such as CMTS 110.

The computer system 1000 includes one or more processors (also called central processing units, or CPUs), such as a processor 1004. The processor 1004 is connected to a communication bus 1006. The computer system 1000 also includes a memory 1008, such as random access memory (RAM). The main memory 1008 has stored therein control logic (computer software), and data.

The computer system 1000 may also include one or more secondary storage devices 1010. The secondary storage devices 1010 may include, for example, a hard disk drive 1012 and/or a removable storage device or drive 1014. The removable storage drive 1014 can represent a compact disk drive, an optical storage device, etc.

The removable storage drive 1014 interacts with a removable storage unit 1018. The removable storage unit 1018 includes a computer useable or readable storage medium having stored therein computer software (control logic) and/or data. Removable storage unit 1018 can represent an optical storage disk, flash memory device, or any other computer data storage device. The removable storage drive 1014 reads from and/or writes to the removable storage unit 1018 in a well known manner.

The computer system 1000 further includes a communication or network interface 1024. The communications interface 1024 enables the computer system 1000 to communicate with remote devices. For example, the communications interface 1024 allows the computer system 1000 to communicate over a communication network or path 1026. The network interface 1024 may interface via wired or wireless connections.

Control logic may be transmitted to and from the computer system 1000 via the communication path 1026. More particularly, the computer system 1000 may receive and transmit carrier waves (electromagnetic signals) modulated with control logic via the communications path 1026.

Any apparatus or manufacture comprising a computer useable or readable medium having control logic (software) stored therein is referred to herein as a computer program product or program storage device. This includes, but is not limited to, the computer system 1000, the main memory 1008, the hard disk 1012, and/or the removable storage units 1018. Such computer program products, having control logic stored therein that, when executed by one or more data processing devices, cause such data processing devices to operate as described herein, represent embodiments of the invention. In particular, the functionality described above, such as that illustrated in FIGS. 2-5 and the accompanying text and examples, can be embodied as one or more computer program products.

The invention can work with software, hardware, and/or operating system implementations other than those described herein. Any software, hardware, and operating system implementations suitable for performing the functions described herein can be used.

VII. Conclusion

The above discussion shows the following attributes of this invention:

Adding and removing entries in the queue comprises reading and writing a single value (e.g., 16-bits). There is no need to manage node pointers as in a traditional linked list.

Finding the location where a segment should be stored includes hashing the PSN, rather than searching through a list of segments already queued.

Forwarding segments in PSN order includes incrementing an index value (next PSN), rather than walking linked lists.

Timeouts/timers are managed via the same mechanism as segments, and don't require separate memory or state.

The CM can check to see if a timer has expired by using subtraction (CurrentTimeMs−SparseArray[Next PSN] >=MaxDelayMs).

While some embodiments of the present invention have been described above, it should be understood that it has been presented by way of examples only and not meant to limit the invention. It will be understood by those skilled in the art that various changes in form and detail may be made therein without departing from the spirit and scope of the invention as defined in the appended claims. Thus, the breadth and scope of the present invention should not be limited by the above-described exemplary embodiments, but should be defined only in accordance with the following claims and their equivalents.

What is claimed is:

1. A method for determining whether an expected segment from a bonding session is lost, comprising:
   (a) receiving a segment over a bonding channel from among a bonding channel set (BCS);
   (b) determining if a sequence number of the segment matches an expected sequence number of an expected segment;
   (c) queuing the segment when the sequence number does not match the expected sequence number; and
   (d) designating the expected segment as lost when there is at least one queued segment that corresponds to each bonding channel of the BCS.

2. The method of claim 1, further comprising:
   (e) forwarding the segment for further processing when the sequence number matches the expected sequence number.

3. The method of claim 2, wherein step (e) comprises:
   (e)(i) forwarding the segment and any queue segments that correspond to succeeding sequence numbers less than a sequence number of the expected sequence number for further processing.

4. The method of claim 1, wherein step (c) comprises:
   (c)(i) queuing the segment in a memory at a location whose address is converted to a segment index.

5. The method of claim 4, wherein step (c)(i) comprises:
   (c)(i)(A) writing the segment to a buffer in the memory;
   (c)(i)(B) converting the address of the buffer into the segment index;
   (c)(i)(C) hashing the sequence number of the segment to create an index to a sparse array; and
   (c)(i)(D) writing the segment index to the sparse array at a location in the sparse array indicated by the index to sparse array.

6. The method of claim 1, further comprising:
   (e) determining if any missing segment has been missing for longer than a predetermined interval; and
   (f) designating the missing segment as lost when the missing segment has been missing for longer than a predetermined interval.

7. The method of claim 1, further comprising:
   (e) incrementing the expected sequence number to a sequence number of a next segment.

8. A cable modem configured to receive a segment over a bonding channel from among a bonding channel set (BCS), comprising:
   a processor configured to determine if a sequence number of the segment matches an expected sequence number of an expected segment; and
   a memory configured to queue the segment when the sequence number does not match the expected sequence number,
   wherein the processor is configured to designate the expected segment as lost when there is at least one queued segment that corresponds to each bonding channel of the BCS.

9. The cable modem of claim 8, wherein the processor is further configured to forward the segment for further processing when the sequence number matches the expected sequence number.

10. The cable modem of claim 9, wherein the processor is further configured to forward any queue segments that correspond to succeeding sequence numbers less than a sequence number of the expected sequence number for further processing.

11. The cable modem of claim 8, wherein the memory is configured to queue the segment at a location whose address is converted to a segment index.

12. The cable modem of claim 11, wherein the memory is configured and arranged to form a sparse array, the memory being configured to queue the segment by:
   (i) writing the segment to a buffer;
   (ii) converting the address of the buffer into the segment index;
   (iii) hashing the sequence number of the segment to create an index to the sparse array; and
   (iv) writing the segment index to the sparse array at a location in the sparse array indicated by the index to sparse array.

13. The cable modem of claim 8, wherein the processor is further configured to determine if any missing segment has been missing for longer than a predetermined interval and to designate the missing segment as lost when the missing segment has been missing for longer than a predetermined interval.

14. The cable modem of claim 8, wherein the processor is further configured to increment the expected sequence number to a sequence number of a next segment.

15. A cable modem termination system configured to receive a segment over a bonding channel from among a bonding channel set (BCS), comprising:
   a processor configured to determine if a sequence number of the segment matches an expected sequence number of an expected segment; and a memory configured to queue the segment when the sequence number does not match the expected sequence number, wherein the processor is configured to designate the expected segment as lost when there is at least one queued segment that corresponds to each bonding channel of the BCS.

16. The cable modem termination system of claim 15, wherein the processor is further configured to forward the segment for further processing when the sequence number matches the expected sequence number.

17. The cable modem termination system of claim 16, wherein the processor is further configured to forward any queue segments that correspond to succeeding sequence numbers less than a sequence number of the expected sequence number for further processing.

18. The cable modem termination system of claim 15, wherein the memory is configured to queue the segment at a location whose address is converted to a segment index.

19. The cable modem termination system of claim 18, wherein the memory is configured and arranged to form a sparse array, the memory being configured to queue the segment by:
  (i) writing the segment to a buffer;
  (ii) converting the address of the buffer into the segment index;
  (iii) hashing the sequence number of the segment to create an index to the sparse array; and
  (iv) writing the segment index to the sparse array at a location in the sparse array indicated by the index to sparse array.

20. The cable modem termination system of claim 15, wherein the processor is further configured to determine if any missing segment has been missing for longer than a predetermined interval and to designate the missing segment as lost when the missing segment has been missing for longer than a predetermined interval.

* * * * *